May 7, 1957 T. B. FUNK 2,791,079
HANDLE OPERATED CLUTCH ACTUATOR FOR LAWN MOWERS
Filed Aug. 26, 1953
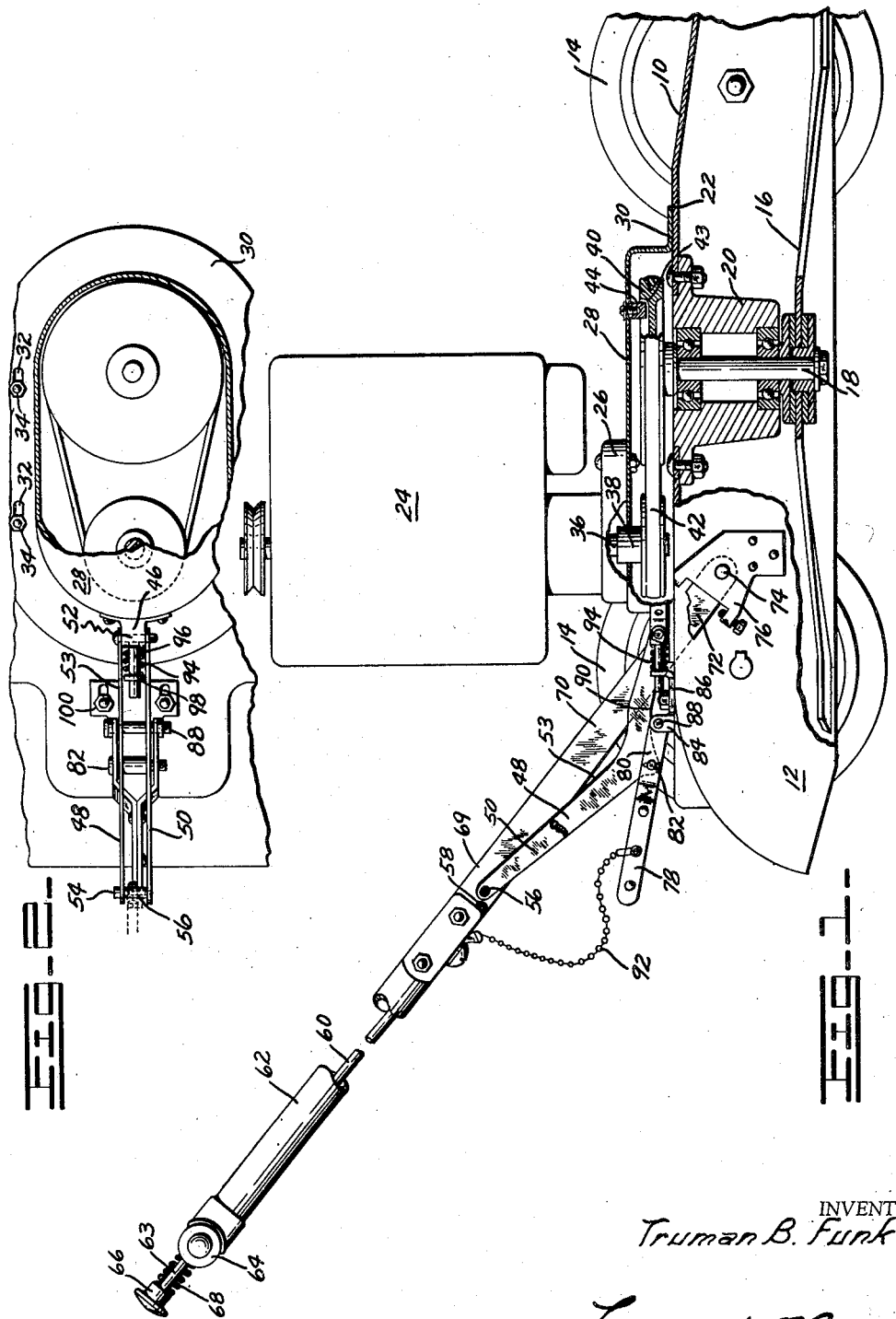
INVENTOR
Truman B. Funk
BY
ATTORNEY

United States Patent Office 2,791,079
Patented May 7, 1957

2,791,079

HANDLE OPERATED CLUTCH ACTUATOR FOR LAWN MOWERS

Truman B. Funk, Jackson, Mich., assignor to Yard-Man, Inc., Jackson, Mich., a corporation of Michigan Application August 26, 1953, Serial No. 376,654

4 Claims. (Cl. 56—25.4)

The present invention relates to improvements in motorized equipment such as lawn mowers, lawn sweepers, leaf grinders, floor sweepers, polishers and the like, in which the equipment is manually guided by a person following the equipment as it is propelled over the ground, floor or other surface. More specifically, the invention is an improvement over the disclosure of my co-pending application Serial No. 265,599 filed January 9, 1952, now Patent No. 2,742,750.

In my Patent No. 2,247,333 is disclosed a power lawn mower in which the clutching and declutching of the ground wheels to the prime mover is controlled solely by raising and lowering the guiding handle. It is the object of the present invention to provide a similar type of control for equipment in which the prime mover is shifted in the manner disclosed in my said co-pending application.

In the drawings,

Fig. 1 is a side elevational view partly shown in broken cross-section and with the wheels removed from one side of a lawn mower embodying the principle of the present invention, and Fig. 2 is a fragmentary plan view of the structure shown in Fig. 1 with the engine removed.

Referring to the illustrated form of the invention, my improved control mechanism is shown applied to a rotary lawn mower 10 having an open bottom housing 12 to which the ground wheels 14 are mounted on opposite sides. A rotary cutter blade 16 is carried on a driven shaft 18 mounted in the bearing 20 attached to the under side of the flat central portion 22 of the housing 12.

The engine 24 has a base 26 mounted upon the open bottom housing 28. A peripheral flange 30 of the housing 28 rests upon the surface 22. Elongated slots 32 in the flange 30 receive combination hold-down and guide bolts 34, there being a sliding fit between the heads of bolts 34 and the upper surface of the flange 30 to permit the housing 28 to be shifted longitudinally upon the surface 22 within the limits of the slots 32. The drive shaft 36 of the engine 24 carries a pulley 38 which drives the pulley 40 on the shaft 18 through the belt 42. With the housing 28 in the position shown, the belt 42 is tightened and the shaft 18 would be driven by the shaft 36. When the housing 28 is shifted to the right in Fig. 1, the belt 42 will be loosened declutching the shaft 18 from the shaft 38. This movement will also bring the brake lock 44 into engagement with the inside of the rim 43 of the pulley 40 to arrest the rotation of the shaft 18 and the cutting blade 16 even though the engine 24 continues to operate.

The shifter mechanism for the housing 28 and the improved handle control therefor comprises a bracket 46 to which a pair of similar parallel L-shaped arms 48 and 50 are pivotally connected upon opposite sides of the bracket 46 upon a pin 52 to collectively define a link 53 which is one of the operating links of the toggle shifter to be described. A shoulder bolt 54 connects as well as spaces the upper ends of the arms 48 and 50 with the central portion 56 of the bolt 54 constituting an abutment to be engaged by the end lower 58 of the rod 60. As shown, the rod 60 is carried within the tubular guide handle 62 with its upper end 63 projecting out between the conventional handle bars 64 to which a knob 66 is attached to be depressed by the thumb of the operator against the tension of the spring 68 to project the end 58 of the rod 60 into the path of the abutment portion 56. It will be understood that the end 58 is disposed in the crotch 69 of the conventional forked arms 70 and 72 of the handle 62 pivotally connected at their lower ends on pins 74 of brackets 76 carried on opposite sides of the housing 12.

The toggle shifter for the housing 28, in addition to the link 53 defined by the arms 48 and 50, includes a link arm 78, forked at its inner end to provide portions 80 between which the arms 48 and 50 are disposed and connected by a hinge pin 82. Spaced turned-up ears 84 of the bracket 86 carry the outer ends of the forked portion 80 on the pin 88. It will be noted that the arms 48 and 50 are off-set slightly at 90 to clear the pin 88 when the toggle is extended by bringing the pin 82 into alignment with the pins 52 and 88. A flexible chain or other similar member is shown connected between the arm 78 and the handle 62 to provide a lost motion connection. To assist in shifting to and holding the housing 28 in its loose belt position a compression spring 94 is guided upon the extension 96 of the bracket 46; the extension 96 sliding in a slotted spring abutment 98 constructed as an upturned portion of the bracket 86 and connected to the housing 12 by bolts 100.

In operation the chain 92 has sufficient slack to permit the handle 62 to be oscillated about its pivot 74 throughout an arc normally experienced in the operation of a lawn mower over the ground. However, when it is desired to collapse the toggle joint and shift the housing 28 to the right as viewed in Fig. 1, assisted by the spring 94, the operator will lift upwardly upon the handle 62 elevating the same sufficiently to remove the slack from the chain 92 with the continued upward movement of the handle 62 rotating the link arm 78 about its pivot 88 to collapse the toggle joint, shifting the housing 28 and loosening the belt 42 to interrupt the drive of the cutter blade 16. Thereafter the handle may be lowered or completely released without in any way affecting the operation of the lawn mower and the engine 24 will continue to be declutched from the cutting blade 16. To resume the driving connection between the cutting blade 16 and the engine 24, the operator will raise the handle 62 sufficiently to clear the abutment 56 and by depressing the knob 66 will project the end 58 of the rod 60 into the path of the abutment 56 whereby the lowering of the handle 62 will cause the link 53 to be rocked counterclockwise about its pivot 52 forcing the link 78 counterclockwise about its pivot pin 88 to bring the pin 82 into alignment with the pins 52 and 88. Upon imparting such movement to the link 53, the pivot pin 52 will move to the left compressing the spring 94 and shifting the housing 28 to the left as viewed in Fig. 1 to tighten the belt 42 and restore the drive between the engine 24 and the cutting blade 16. After the drive has been effected by the operator the knob 66 is released to the action of the spring 68 with the end 58 being withdrawn from the path of the abutment 56 and thereafter the handle 62 may be swung through the normal operational arc without tensioning the chain 92 or operating the link 53.

Having thus described my invention what I claim as novel and desire to protect by Letters Patent is:

1. In combination with a power lawn mower having a driven cutting element and an engine with shifter mechanism for selectively driving the cutter from the engine and having a pivoted operating handle for guiding the mower over the ground, of means for actuating said shifter mechanism comprising a connection between said shifter mechanism and said handle for actuating said mechanism into one position upon pivotal movement of said handle in one direction, and means carried by said handle and selectively positionable to engage said shifter mechanism upon pivotal movement of said handle in the opposite direction to move said shifter mechanism into another position.

2. In the combination of claim 1 wherein said handle carried means is in the form of a rod extending along the axis of said handle and having its lower end projectable into engagement with said shifter mechanism upon pivotal movement by the handle.

3. In the combination of claim 1, said connection between said handle and said shifter mechanism having lost motion with the respective parts to provide said handle with a predetermined pivotal operating range without influencing said shifter mechanism.

4. In the combination of claim 1, said connection between said handle and said shifter mechanism having lost motion with the respective parts to provide said handle with a predetermined pivotal operating range without influencing said shifter mechanism, and said handle carried means is normally inoperative and retracted from operative association with said shifter mechanism.

References Cited in the file of this patent
UNITED STATES PATENTS

| | | |
|---|---|---|
| 2,160,259 | Cooper | May 30, 1939 |
| 2,247,333 | Funk | June 24, 1941 |
| 2,545,074 | Dielschneider | Mar. 31, 1951 |